United States Patent [19]
Amos

[11] 3,952,390
[45] Apr. 27, 1976

[54] METHOD OF PRODUCING BALL JOINTS
[76] Inventor: James J. Amos, 568 Hyatts Road, Delaware, Ohio 43015
[22] Filed: Mar. 27, 1974
[21] Appl. No.: 455,055

Related U.S. Application Data
[62] Division of Ser. No. 337,154, March 1, 1973, Pat. No. 3,831,244.

[52] U.S. Cl. .................. 29/149.5 B; 29/148.4 R; 29/148.4 B; 29/149.5 R
[51] Int. Cl.² .......................................... B21D 53/10
[58] Field of Search ............... 29/149.5 B, 148.4 A, 29/149.5 R, 148.4 R; 219/104, 107, 110

[56] References Cited
UNITED STATES PATENTS

| | | | |
|---|---|---|---|
| 1,039,674 | 9/1912 | Schatz | 29/148.4 B |
| 1,223,091 | 4/1917 | Murray et al. | 219/104 |
| 1,339,972 | 5/1920 | Murray et al. | 219/104 |
| 2,265,839 | 12/1941 | Hufferd et al. | 29/149.5 B |
| 2,430,237 | 11/1947 | Moncher | 219/110 |
| 2,625,736 | 1/1953 | Klages | 29/148.4 B X |
| 2,963,772 | 12/1960 | Niles, Sr. | 29/148.4 B |
| 3,553,420 | 1/1971 | Shearer et al. | 29/110 |
| 3,844,010 | 10/1974 | Frost et al. | 29/148.4 A |

Primary Examiner—C. W. Lanham
Assistant Examiner—V. K. Rising

[57] ABSTRACT

A method of producing ball joints of the type that include a ball and stem member pivotally mounted in a housing, the method comprising forming the ball stud or pivoted member by heading a work-piece to provide an enlarged head portion that forms a first section of the spherical bearing surface of the ball stud, and by next forming a second head portion from a second work-piece that provides a second section of the spherical bearing surface of the ball stud. The two formed work-pieces are next welded together at confronting surfaces to provide a fused junction and the junction and spherical surface is next machined to provide the finished bearing head of spherical contour.

2 Claims, 13 Drawing Figures

METHOD OF PRODUCING BALL JOINTS

REFERENCE TO CO-PENDING APPLICATION

This application is a division of my co-pending application Ser. No. 337,154 filed Mar. 1, 1973, now U.S. Pat. No. 3,831,244 issued Aug. 27, 1974.

BACKGROUND OF THE INVENTION

This invention relates generally to ball joints of the type that are used in the automotive steering systems and more particularly to a novel method for producing ball joints which ball joints include a ball stud or pivoted member wherein the spherical portion providing the bearing surface is of composite construction consisting of a headed portion on the stem and a separate head portion which are welded together at a fused junction.

PROBLEMS IN THE ART

In the fabrication of the ball joints, it has been common practice in the art to form the pivot members from a single work-piece by forging or cold heading the spherical ball portion on the end of a portion of the work-piece which forms the shank of the pivot member. Such practices have required, in the forming of the ball, the displacement of large volumes of metal and hence forging machines of large size and high capacity.

It should further be mentioned that recent requirements in that art are demanding larger diameter balls for any given diameter or shank in order to provide greater angularity of motion of the shank or stem of the pivoted member after it has been mounted in the housing. Hence such requirements have demanded during the heading process the gathering of much greater portions of the shank metal in order to produce the relatively larger ball. Hence the need for larger, slower and more costly equipment has resulted.

Another problem has become present in the art as the result of newer designs using plastic bearing materials within the housing for pivotally supporting the ball portion of the pivoted member. In the use of such modern plastic bearing materials it has been found that they are subject to cold flow tendencies under the load in the event there are irregularities in the shape of the pivoted ball and hence it has been determined that it is important that the ball ends be as nearly spherical in shape as it is possible to produce.

In accordance with practices in the prior art where the ball portion is integrally formed by cold heading the stud a problem has been present in that there is always a void or unfilled portion on the side of the ball opposite the shank. Such void in the spherical shape of the ball is incompatible with use in supported relationship with plastic bearing materials as mentioned above.

Another problem has been present in the art with the use of the above mentioned plastic bearing materials in that a high quality of finish on the ball is required in order that the ball be compatible with the above mentioned cold flow properties of the plastic bearing materials. That is to say, that the plastic bearing material, under load, tends to lock into any irregularity which may be present in the surface of the ball.

SUMMARY OF THE INVENTION

In general, the present invention comprises a novel method of producing ball joints by forming the ball studs or pivoted members from shank-forming work-pieces which are headed so as to provide a portion of the spherical ball surface on one end thereof and by welding such shank-forming work-pieces to one or more separate head forming work-pieces which provide the remaining section or sections of the spherical surface of the ball. The separate work-pieces are joined together by welding at confronting surfaces to provide one or more fused junctions.

As a primary aspect of the present invention, since the ball portions of the ball studs are compositely formed from one or more separate work-pieces, and are not integrally formed with the shank from a single work-piece, it is readily feasible to provide balls of relatively large diameter without the necessity of gathering, in the heading dies, large quantities of metal from a single shank-forming work-piece during the cold heading operation.

As another aspect of the present invention the composite construction of the spherical bearing portions of the ball studs permits the formation of the required headed portions by merely using a relatively small and inexpensive forging machine of the capacity and type used to make bolts and screws.

As another aspect of the present invention, due to the composite structure of the spherical ball portions, the separate sections of the ball can be made of different metals possessing different characteristics as may be desired.

As another aspect of the present invention, due to the composite construction of the ball portions, it is readily possible to accurately form the ball to a precise spherical curvature which is devoid of voids such as are present in one piece ball portions that are integrally formed with the shank work-piece. Such voids, in the form of unfilled flats on the ball, are caused by unfilled die portions due to the requirement of the displacing of a large amount of metal when attempting to form relatively large one-piece balls integrally with shank portions.

As still another aspect of the present invention, due to the composite ball construction, the separate spherical sections of the ball stud can readily be formed with cup-shaped head portions so as to provide a cavity for the containment of a lubricant, which lubricant can be gradually bled outwardly from the cavity to the spherical bearing surface by providing porosity of metal in certain of the ball portions in forming them by powdered metallurgy or by forming small orifices in the spherical surface.

As still another aspect of the present invention, as a result of the composite ball construction, with a portion of the ball being integral with the shank, the finished assembled joint, FIG. 10, is prevented from coming apart in the event there is a failure in the weld at the junction of the ball portion.

Further objects and advantages of the present invention will be apparent from the following description, reference being had to the accompanying drawings wherein preferred forms of embodiments of the invention are clearly shown.

3

Figure 7:
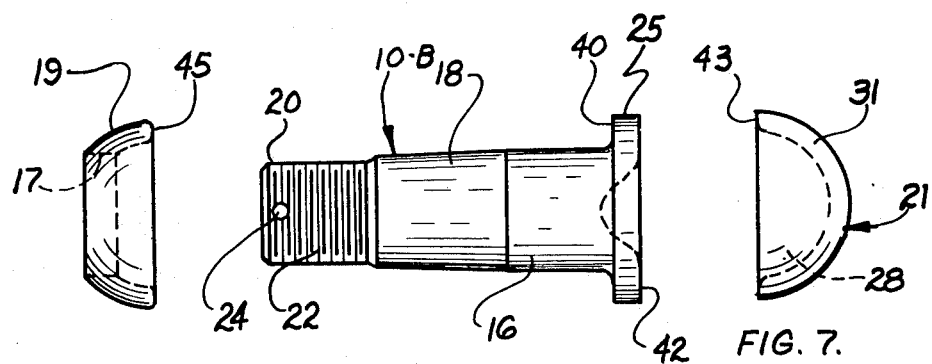
Figure 8:
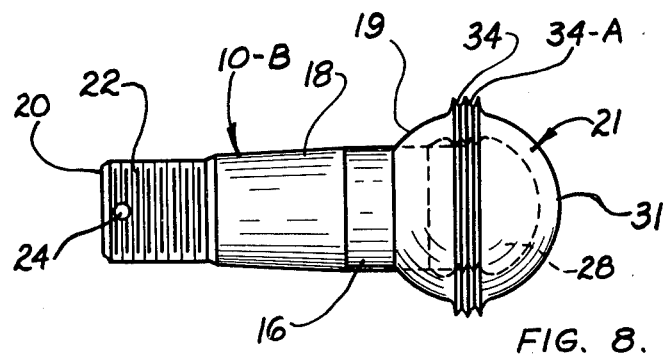
Figure 9:
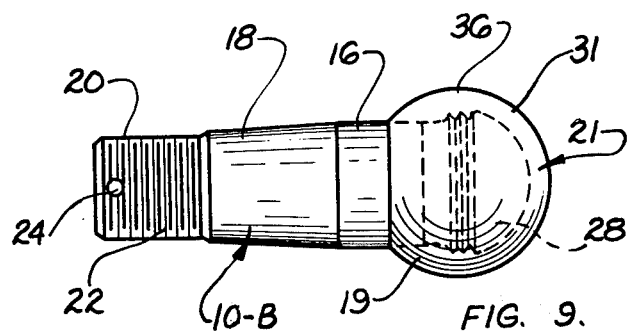
Figure 10:
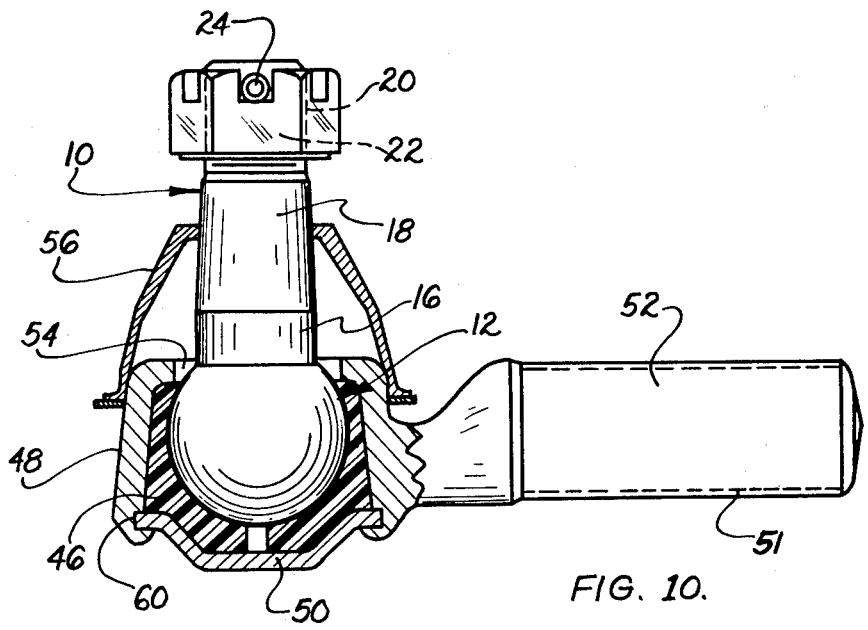
Figure 11:
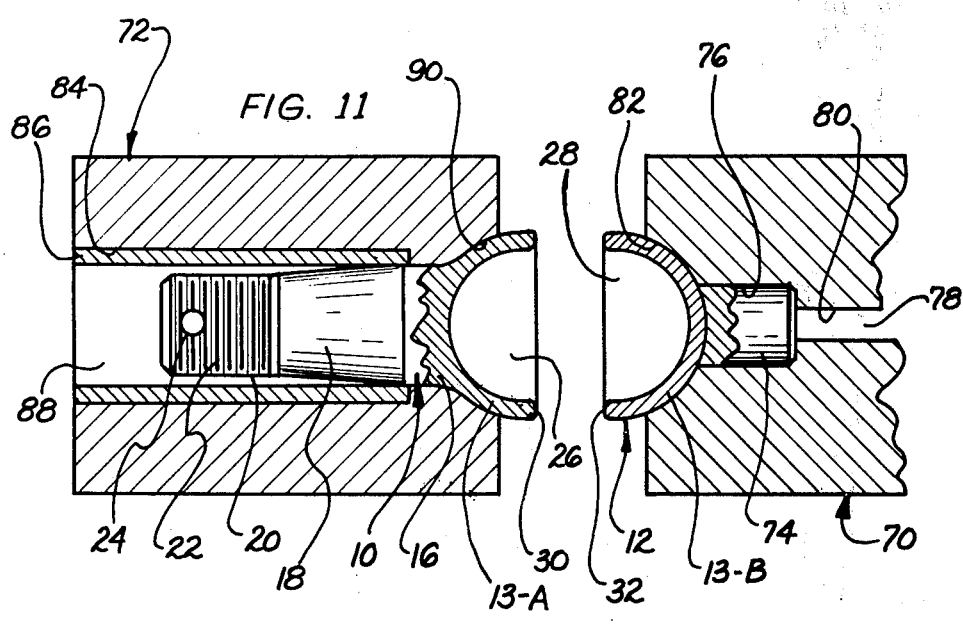
Figure 12:
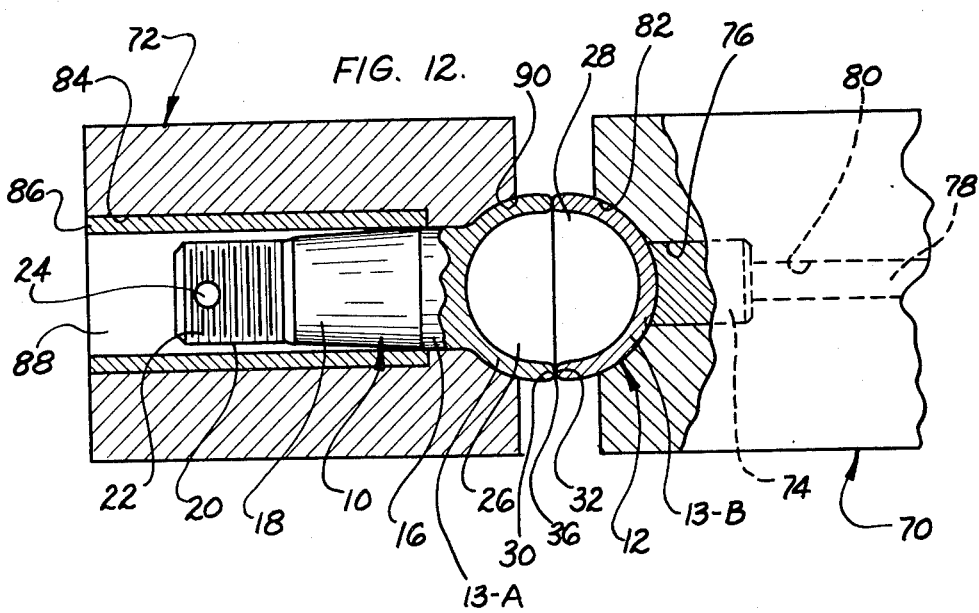
Figure 13:
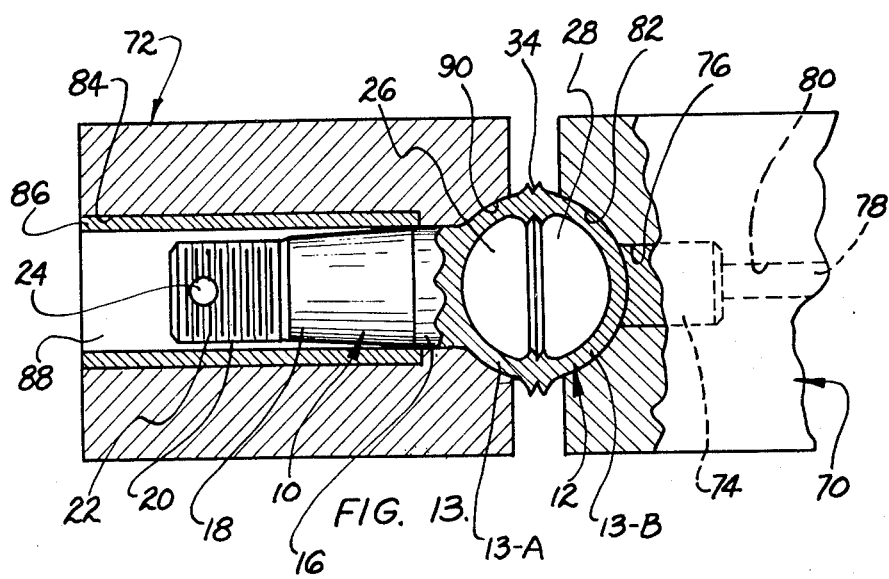

FIGS. 7, 8, and 9 are side elevational views illustrating still another method of fabricating ball studs in accordance with the present invention;

FIG. 10 is a side elevational view, partially in section, of an assembled pivot joint constructed in accordance with the present invention, the section being taken along a vertical plane through the center line of the pivot joint; and FIGS. 11 through 13 are side elevational views, partially in section, showing a method of fusing ball studs by a projection welding process in accordance with the present invention.

DESCRIPTION OF THE EMBODIMENTS

Figure 1:
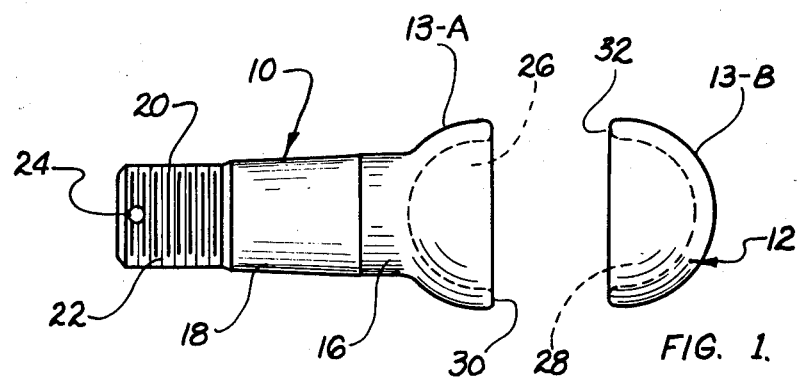
FIGS. 1 through 3 are side elevational views illustrating a method of fabricating ball studs in accordance with the present invention.

Referring in detail to the drawings, a headed work-piece is indicated generally at 10 in FIG. 1 and includes a shank portion 18 and a first head portion 13-A provided with a recess 26 and a junction-forming surface 30.

Work-piece 10 can be forged from metal wire in a conventional cold heading machine so as to upset the metal on the end of the wire work-piece and thereby form the head portion 13-A by confining the flowing metal in the die of the forging machine.

Shank 18 is further provided with an outer end provided with threads 22 and a cotter hole 24.

With continued reference to FIG. 1, a second head portion 13-B can be formed from metal sheet material by conventional stamping process in a press, using stamping dies shaped to form the cup-shaped portion 13-B which includes a recess 28 and a junction-forming surface 32.

Figure 2:
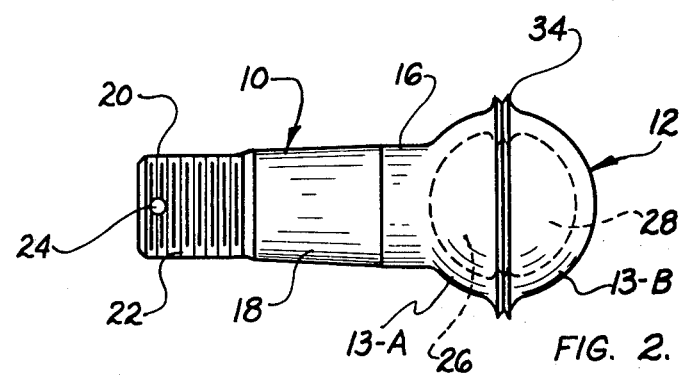

Referring next to FIG. 2, the two work-pieces 10 and 12 are assembled at the confronting junction-forming surfaces 30 and 32 and then subjected to head and pressure in the die of a projection welding machine so as to form the fused junction 34 seen in FIG. 2.

Reference is next made to FIGS. 11–13 which illustrate the assembly of the portions of the composite ball stud in a projection welding apparatus.

In FIG. 11, the previously mentioned shank portion 10 is positioned in electrode 72 with the shank portions 18 and 20 inserted into an insulating sleeve 86 which sleeve is mounted in a bore 88 in the electrode. The ball portion 13-A of the shank portion 10 is positioned in a conforming surface 90 of electrode 72.

With continued reference to FIG. 11, the previously mentioned ball portion 12 is positioned in a second electrode indicated generally at 70 with its outer surface 13-B in conforming relationship with a spherical surface 82 of electrode 70. The ball portion 12 is retained in position in the electrode by an electromagnet mounted in a bore 76 in electrode 70.

FIG. 12 shows the electrodes 70 and 72 after they have been moved relative to one another so as to cause the confronting surfaces 30 and 32 of the work-pieces to engage one another at a junction 36. With the electrodes in the position of FIG. 12, pressure is applied to the work-pieces by urging the electrodes towards one another and at the same time current is applied to the electrodes. Since the work-pieces 10 and 12 are formed of conductive metal such as steel alloy electrical current will flow through the work-pieces and the electrical energy will be concentrated at a zone 36 where the confronting surfaces 30 and 32 engage one another. With such localized application of energy the metal at the zone 36, FIG. 12, is caused to upset and weld which permits the pressurized electrodes to move towards one another for a pre-determined distance, which distance is a function of the pressure being applied as well as the magnitude of the electrical current to which the work-pieces are subjected by the electrodes 70 and 72.

FIG. 13 shows the work-pieces after they have been joined at the fused junction 34.

Figure 3:
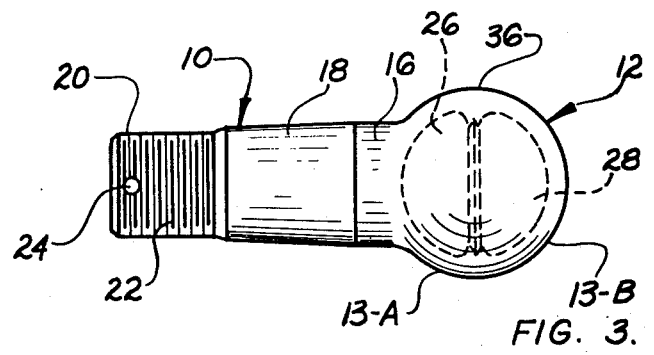

Referring next to FIG. 3, the outer surfaces of the head portions 13-A and 13-B, together with the fused junction 34, are next subjected to machining, grinding, and burnishing so as to provide a finished surface 36 on the exterior of the bearing portion of the ball stud.

Reference is next made to FIG. 10 which shows a typical assembly of the composite ball stud 10 of FIGS. 1–3 mounted in a ball joint housing 48. A bearing material 46 is mounted within the housing and such bearing material is preferably formed of suitable synthetic resinous material with the bearing portion being retained within the housing by crimping a cover 50 in position of housing 48 as seen at 60.

It will be mentioned that the upper portion of the housing is provided with a hole 54 through which the shank portion 16 is extended with such hole being large enough to furnish clearance around the shank portion so as to provide the required angularity of movement for the joint.

The finished ball joint further comprises a dust cover 56, a nut 22 retained by a cotter key 24, and a main stem portion 52 with such main stem portion being threaded so as to permit the mounting of the housing portion of the joint to one of the relatively movable components which are to be connected by the ball joint. The other relatively movable component is mounted to the joint at the shank portion 18.

Figure 4:
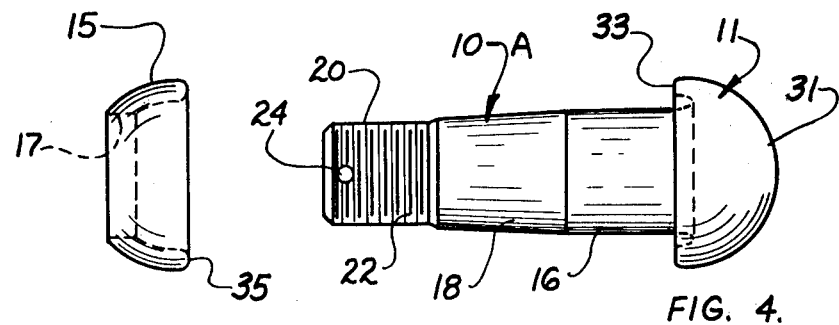
FIGS. 4 through 6 are side elevational views illustrating still another method of fabricating ball studs in accordance with the present invention.
Figure 5:
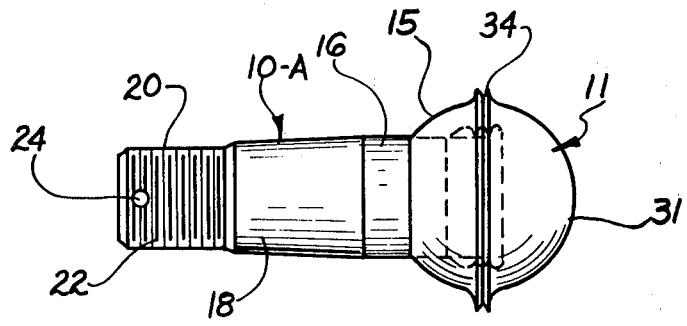
Figure 6:
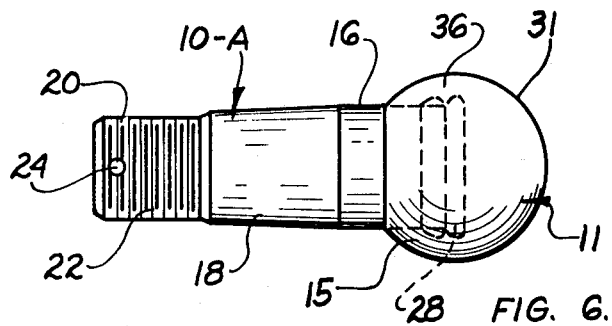

Reference is next made to FIGS. 4 through 6 which illustrate another method of producing ball studs which include composite spherical head portions. Here it will be noted that the head work-piece 10-A is headed so as to form an enlarged head portion 11 having an outwardly facing spherical surface 31 and an inwardly facing junction-forming surface 33.

The embodiment of FIGS. 4 through 6 further includes a second head portion 15 formed from a separate work-piece by a stamping machine, said second head portion including an inwardly facing junction forming surface 35 and a central bore 17.

The two work-pieces are next assembled as shown in FIG. 5 by extending shank 18 through bore 17 such that the surfaces 33 and 35 are in confronting relationship.

The assembled work-pieces, FIG. 5, are then placed in a projection welding machine and subjected to heat and pressure, concentrated at confronting surfaces 33 and 35 so as to form a projection welded junction 34.

The welded assembly is finished by subjecting junction 34 and surfaces 28 and 31 to machining, grinding, and burnishing so as to provide a polished bearing surface of highly accurate spherical contour.

It should be mentioned that the embodiments of FIGS. 1 and 4 each include an internal cavity 28 which can be used for the containment of lubricants and which also serves to reduce the amount of metal displacement required. The cavity 28 also results in a decrease in the weight of the ball studs.

Reference is next made to FIGS. 7 through 9 which illustrate still another method for fabricating ball studs of composite construction in accordance with another method of the present invention.

In this embodiment a headed work-piece 10-B is formed in a conventional cold heading machine so as to provide an enlarged head portion 40 in the form of a flange including a peripheral surface 25 and an outwardly facing junction surface 42.

It should be mentioned that work-piece 10-B is provided with an end portion 20 provided with threads 2 and a cotter hole 24.

Second head forming work-piece 21 is stamped in a conventional punch press, or other suitable means, to the cut shape illustrated which includes an inwardly facing junction forming surface 43.

Still another head forming work-piece 19 is stamped to the shape shown in FIG. 7 so as to include an inwardly facing junction forming surface 45 and a central bore 17.

Referring next to FIG. 9 head portion 21 is assembled on work-piece 10-B with junction forming surfaces 43 and 42 in confronting relationship. Also, the other head forming work-piece 19 is assembled on work-piece 10-B by inserting shank portion 18 through bore 17 with the junction forming surfaces 40 and 45 in confronting relationship.

The assembled work-pieces are next placed in a projection welding machine and subjected to head and pressure so as to form two fused junctions 34 and 34-A, FIG. 8, at the confronting junction forming surfaces mentioned above. The fused assembly is next machined, ground and burnished so as to provide an accurately shaped spherical surface 31.

While the forms of embodiments of the present invention as herein disclosed constitute preferred forms, it is to be understood that other forms might be adopted.

I claim:

1. The method of making ball studs for pivot joints comprising, in combination, forming a shank portion by heading a work-piece to provide an enlarged head portion provided with an outwardly convex generally spherical surface and an inwardly facing junction forming surface; forming a second head portion from a second work-piece provided with a generally spherical outer surface, a second inwardly facing junction forming surface, and a central bore; assembling said first and second work-pieces by extending said shank through said bore with said junction forming surfaces in confronting relationship; welding said first and second head portions together at said confronting junction forming surfaces to provide a fused junction; and machining said junction and bearing surfaces to provide a finished bearing head of substantially spherical contour.

2. The method defined in claim 1 wherein certain of said work-pieces are formed with a recess that provides a cavity within the assembled head portions.

* * * * *